March 11, 1930.   A. S. CRAIG   1,750,509

TIRE DEFLATION SIGNAL

Filed March 27, 1929

INVENTOR:
Arthur S. Craig,
BY *[signature]*

ATTORNEY.

Patented Mar. 11, 1930

1,750,509

UNITED STATES PATENT OFFICE

ARTHUR S. CRAIG, OF KANSAS CITY, MISSOURI

TIRE-DEFLATION SIGNAL

Application filed March 27, 1929. Serial No. 350,307.

The present invention relates to tire signal devices, and aims to devise an improved and more efficient means of simple construction for producing an audible and positive alarm signal whenever the tire with which the device is used is becoming under-inflated.

Accordingly, my invention comprises a device of a minimum number of parts adapted to be conveniently applied in operative relation to a tire in such a way as to be automatically released by a reduction in the tire pressure and cause a signal to be produced as by striking the adjacent mud guard or fender at each turn of the corresponding wheel.

It is further sought to provide a device of this character which can be maintained in inoperative position, at the will of the driver, or be re-set for a second operation of the alarm signal in response to a still further reduction of the tire pressure; and which will be of such simple construction as to be economically manufactured at small expense.

With the foregoing general objects in view, the invention will now be described in detail by reference to the accompanying drawing illustrating one practical form of embodiment of the proposed improvements, after which those features and combinations deemed to be novel will be particularly set forth and claimed.

In the drawing—

Figure 1:
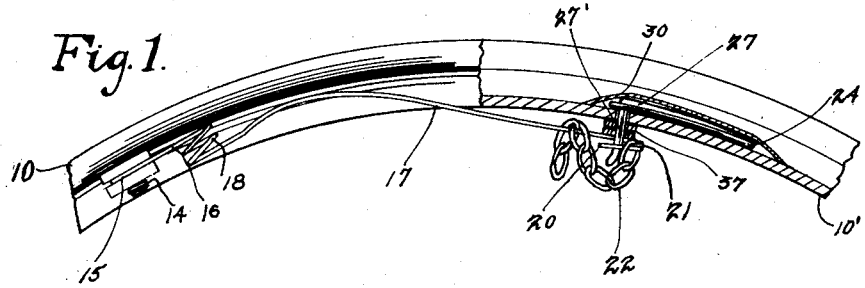
Figure 1 is a fragmentary elevation of a portion of a wheel and rim structure, showing the improved signal device installed in use.
Figure 6:
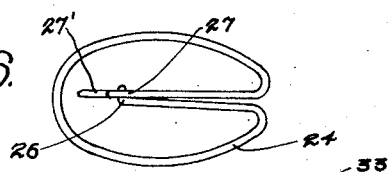
Figure 6 is a detail view of said releasing element.
Figure 2:
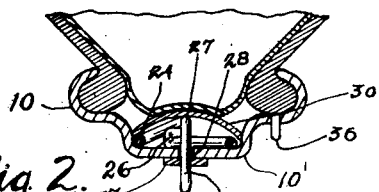
Figure 2 is a cross-sectional detail.

Referring now to the drawing in detail, this illustrates the improved device as applied to the rim structure of a wheel, including the usual tire-retaining portions 10 and drop-center or felly portion 10'. Near the outer margin of the rim is an attaching bolt 14 or the like for engaging a loop or eye 15 formed on the end of the lateral arm 16 of a wire spring member 17 which is constructed of stiff spring wire coiled to provide a spring coil 18 connecting the lateral arm 16 with the main portion of the member 17 which is adapted to project circumferentially of the rim when applied thereto as illustrated in Figure 1. The free end of the spring arm 17 is formed with a pair of eyes or loops 20, 21, the terminal eye or loop 21 carrying a short section of chain links 22 in pendent relation to the end of the spring arm 17.

The other eye or loop 20 of the spring arm 17 is designed for engagement by a spring detent member, also constructed of stiff spring wire having the main body portion 24 adapted to rest against the outer face of the rim, and a pair of outwardly projecting spring arms 26, 27, formed by the end portions of the wire, the terminal 26' of the arm 26 being bent underneath the arm 27, and the terminal 27' of the latter arm projecting through an opening 28 in the drop center or felly portion 10' of the rim to provide a detent finger for engagement with the eye or loop 20 of the spring arm 17.

Figure 3:
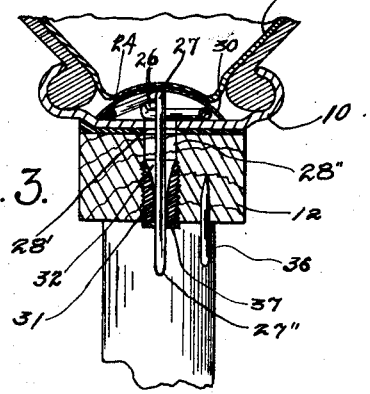
Figure 3 is a similar view illustrating the application of the device in connection with a demountable rim structure.

The construction so far described is that designed for use with the permanent clencher type of rim, and the only change necessary for adapting the device for demountable rims, such as illustrated in Figure 3, is to provide such rims with an opening 28' for registration with the opening 28'' in the wheel rim and felly structure 12, and providing the detent member with a finger 27'' long enough to project through said openings into engagement with the loop 20 of the spring arm 17. If desired, a guide plug 31 with flaring passage 32 may be provided as a wear and guide element for the mouth of the opening 28'',— the passage for the finger 27'' as well as for the finger 27' being sufficiently large for allowing the necessary play for said fingers in response to the movement of the spring arms 26, 27. The opening 28'' will be at the same distance from the valve stem opening as the opening 28' is from the valve stem, in order that the openings 28' and 28'' will be automatically registered on mounting of the rim.

In either construction a protecting pad 30 is cemented to the rim over the detent member, for contact with the inner air tube 33, as illustrated in Figures 1 to 5 inclusive.

In operation, the loop 20 of the spring arm 17 is engaged with the detent finger 27' which will project through the passage 28 sufficiently for engagement with the loop, because of the air pressure in the tube 33 acting to compress the detent member into a substantially flat condition so long as the tube 33 is properly inflated. This position of engagement of the spring arm with the detent member places said arm under tension, exerting both a lateral tension as well as a longitudinal tension or pull upon the detent finger 27'. The chain links 22 may be looped over the ends of the arm 17 and thereby held from dangling, as represented in Figure 1. Upon a reduction of the air pressure in the tube the pressure upon the arms 26, 27, will be correspondingly relaxed, and thus result in a retraction of the finger 27', and finally in disengagement thereof from the loop 20 and release of the spring arm 17.

Figure 4:
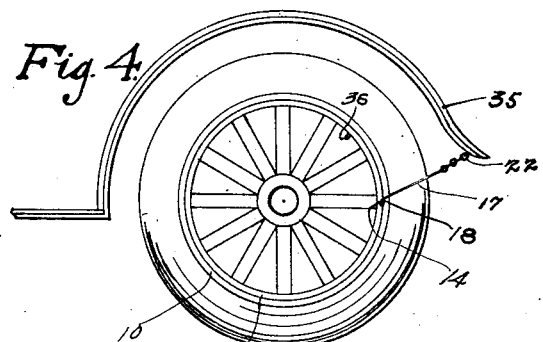
Figure 4 is a side elevation of the wheel, on a smaller scale, and showing the device released.
Figure 5:
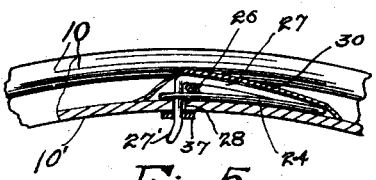
Figure 5 is a sectional detail showing a side view of the releasing element of the device.
Figure 7:
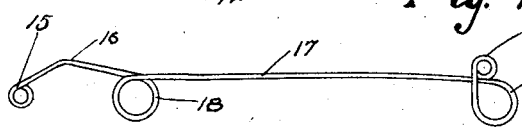
Figure 7 is a plan view of the spring arm member (which carries the chain links) showing its contour as it appears when placed under tension, before released by the detent or releasing element.

This release of the spring arm 17 from the detent finger 27' allows the arm to fly out into approximately radial relation to the wheel and clear of the side edge of the rim. This is due to the normal tendency of the spring arm member to bow both laterally outwardly from the plane of the wheel and also radially away from the center of the wheel, and the location of the attaching bolt 14 near the rim edge of the wheel also facilitates the clearing of both the rim edge and tire in the releasing action. The function of the lateral arm portion 16 is to shoulder that end of the main arm containing the coil 18 against the drop center or felly portion of the rim structure, when the arm is held under tension by the detent finger 27', thereby affording the necessary backing against which said arm is flattened or straightened out of its normally bowed shape when set ready for operation, as shown in Figure 1. When released and the arm flies outward into radial relation to the wheel, as just stated, the chain links will also fly out under the combined action of the spring arm and centrifugal force into alinement with the arm 17, and the combined length of the arm and the links 22 is sufficient to span the distance between the wheel and the adjacent mud guard or fender 35, as represented in Figure 4. and consequently each revolution of the wheel will cause the links 22 to strike the fender with such force as will produce a sharp sounding signal that can not fail to be heard by the driver and thereby warn him of the loss of air pressure in the tire. In both constructions, of Figures 2 and 3, a pin 36 is secured adjacent the detent opening for engagement with the loop 20 in temporarily latching the spring arm 17 and chain links in retracted or inoperative position, until the driver can reach an air station for restoring the tire pressure to normal condition. The same latching function also serves during the changing of a tire.

For varying the sensitiveness of the releasing function one or more washers 37 may be applied over the detent finger 27' as illustrated in Figure 1, thereby varying the amount of retraction necessary for freeing the loop 20 from the detent finger,—as will be readily understood. These washers also serve as protection for practically sealing the openings through the rim or felly structure provided for said detent finger.

It is thus apparent that a reliable and efficient device is provided for sounding a positive audible alarm signal for indicating undue deflation of the tire. One of the practical advantages of the improved device is that it is mounted altogether upon the rim, and consequently interferes in no way whatsoever with the testing of the tire pressure or with the inflation of the tube, or with the changing of tires upon the rim. One important and unique feature and advantage of the device is due to the adjustable provision afforded by means of the washers 37, since after an operation of the alarm, if the tire is found safe to travel some distance farther with the tire partially deflated, the device may be re-set with one of the washers removed, and thus render it operative for giving an additional alarm signal on a further reduction of the tire pressure, indicating that the danger point has been reached if this occurs before reaching an air station. In this way the device functions as a variable gauge of the tire pressure, according to the circumstances or requirements.

It is thus apparent that I have devised an alarm device which is of very simple and compact construction and at the same time entirely practical and efficient in its operation, and while I have described what I have found to represent one satisfactory form of embodiment of the improvements it is obvious that various minor changes or modifications are possible within the scope of my invention, since the automatic releasing construction and operation are adaptable for different characters of signals for fulfilling the alarm function. Accordingly I desire to be understood as reserving the right to make all such changes or modifications as may fairly fall within the scope of the appended claims.

What I claim is:

1. A tire deflation signal comprising, in combination with the tire tube and wheel, a releasable alarm-signal element carried by the wheel, and a detent member engaged with the tube and operating in response to a reduction of the air-pressure therein to release said signal element.

2. A tire deflation signal comprising, in combination with the wheel and tire tube, a releasable alarm-signal element carried by the wheel, and a detent member including an expansible portion interposed between the tube and rim portion of the wheel and operating in response to a reduction of the air-pressure in the tube to release said signal element.

3. A tire deflation signal comprising, in combination with the wheel and tire tube, a releasable alarm-signal element carried by the wheel, and a detent member engaged with the tube operating independently of the tube inflation valve to automatically release said alarm-signal element in response to a reduction of the air-pressure in the tube.

4. A tire deflation signal comprising, in combination with the wheel and tire tube, a releasable alarm-signal element carried by the wheel, and a detent member engaged with the tube operating in response to a reduction of the air-pressure in the tube to release said signal element, and means for varying the sensitiveness of the releasing action of said detent member.

5. A tire deflation signal comprising, in combination with the wheel and tire tube, a spring-acting alarm-signal element carried by the wheel, and a detent member engaged with the tube and having a detent finger engaged with said signal element, the tube-engaging portion of said detent member being adapted to expand in response to a reduction of the air-pressure in the tube and thereby retract said finger to release said signal element.

6. A tire deflation signal comprising, in combination with the wheel and tire tube, a spring-acting fender-striking element carried by the wheel in position to swing normally clear of the rim or felly portion of the wheel into radial relation thereto, and a detent member in engagement with the tube and having a detent finger in retaining engagement with the free end portion of said striking element, and operative in response to a reduction of the air-pressure in the tube to release said element.

7. A tire deflation signal comprising, in combination with the wheel and tire tube, a releasable fender-striking element carried by the wheel, and a detent member including an expansible portion interposed between the tube and rim portion of the wheel and a detent finger in retaining engagement with said striking element, said rim portion of the wheel having an opening providing passage for said detent finger, whereby a reduction of the air-pressure in said tube will cause retraction of said finger and automatically release said striking element.

8. A tire deflation signal comprising, in combination with the wheel and tire tube, a releasable fender-striking element carried by the wheel, a detent member including an expansible portion interposed between the tube and rim portion of the wheel and a detent finger in retaining engagement with said striking element, whereby a reduction in the air-pressure in said tube will cause retraction of said finger and automatic release of said striking element, and one or more washers for adjusting the retaining engagement of said finger and striking element and thereby varying the sensitiveness of the releasing action of said detent member.

9. A tire deflation signal comprising, in combination with the wheel and tire tube, a spring arm carried by the wheel, a flexible fender-striking element carried by said arm, and a detent member interposed between the tube and the rim portion of wheel and provided with a detent finger engaged with said arm whereby the latter is automatically released on a reduction of the air-pressure in the tube for swinging said striking element into engagement with the fender.

10. A tire deflation signal comprising, in combination with the wheel and tire tube, a spring-acting fender-striking arm provided with a laterally extending portion secured to the wheel and supporting the main portion of said arm circumferentially along the rim edge portion of the wheel, and a detent member engaged with the tube and having a detent finger in retaining engagement with the free end portion of said arm and operating to automatically release the latter upon a reduction of the air-pressure in the tube.

11. A tire deflation signal comprising, in combination with the wheel and tire tube, a releasable fender-striking element carried by the wheel, a detent member engaged with the tube and operating in response to a reduction of the air-pressure therein to release said striking element, and a latching element carried adjacent to said detent member for independently retaining said striking element in inoperative position.

In witness whereof I hereunto affix my signature.

ARTHUR S. CRAIG.